(12) United States Patent
Poletti et al.

(10) Patent No.: US 10,776,734 B2
(45) Date of Patent: Sep. 15, 2020

(54) ERGONOMIC SAFETY EVALUATION WITH LABOR TIME STANDARD

(75) Inventors: Steven J. Poletti, Collinsville, IL (US); Chandler K. Varma, Florissant, MO (US); Dennis R. Bouse, Glen Carbon, IL (US)

(73) Assignee: THE BOEING COMPANY, Chicago, IL (US)

( * ) Notice: Subject to any disclaimer, the term of this patent is extended or adjusted under 35 U.S.C. 154(b) by 1142 days.

(21) Appl. No.: 13/608,457

(22) Filed: Sep. 10, 2012

(65) Prior Publication Data

US 2014/0074546 A1 Mar. 13, 2014

(51) Int. Cl.
  *G06Q 10/06* (2012.01)
  *G06Q 10/10* (2012.01)
  *G05B 19/418* (2006.01)

(52) U.S. Cl.
  CPC ... *G06Q 10/0635* (2013.01); *G05B 19/41865* (2013.01); *G06Q 10/06314* (2013.01); *G06Q 10/10* (2013.01); *G05B 2219/32365* (2013.01)

(58) Field of Classification Search
  CPC ..................................................... G06Q 10/06
  USPC ....................................................... 705/7.28
  See application file for complete search history.

(56) References Cited

U.S. PATENT DOCUMENTS

| | | | | |
|---|---|---|---|---|
| 6,931,387 B1 * | 8/2005 | Wong et al. | | 706/50 |
| 7,457,678 B2 | 11/2008 | Smith et al. | | |
| 2006/0004302 A1 * | 1/2006 | Tuckett et al. | | 600/552 |
| 2009/0070163 A1 * | 3/2009 | Angell et al. | | 705/7 |

(Continued)

FOREIGN PATENT DOCUMENTS

| | | |
|---|---|---|
| JP | 7-28891 A | 1/1995 |
| JP | 2002-366718 A | 12/2002 |
| JP | 2003-256578 A | 9/2003 |

(Continued)

OTHER PUBLICATIONS

Guidelines for Exposure Assessment, EPA/600/Z-92/001, May 29, 1992, Risk Assessment Forum U.S. Environmental Protection Agency, Washington, DC, 126 pgs.

(Continued)

*Primary Examiner* — Kurtis Gills
(74) *Attorney, Agent, or Firm* — Womble Bond Dickinson (US) LLP

(57) ABSTRACT

An integrated safety-evaluation with labor-time-standard system is provided that includes a work-task manager, integrated module and ergonomic safety evaluator. The work-task manager may be configured to receive a work instruction and determine work elements applicable to the work instruction, with the work elements may have respective associated elemental unit times, elemental risk ratings and frequency values. The integrated module may be configured to receive the elemental unit times, elemental risk ratings and frequency values for the work elements, and calculate a labor time standard and ergonomic safety rating therefrom. And the ergonomic safety evaluator may be configured to receive the labor time standard and ergonomic safety rating and perform an ergonomic safety evaluation therefrom. In this regard, the ergonomic safety evaluator may be configured to perform the ergonomic safety evaluation to determine whether to release or reject the work instruction.

8 Claims, 4 Drawing Sheets

(56) References Cited

U.S. PATENT DOCUMENTS

2009/0157569 A1* 6/2009 Henby et al. ............... 705/500

FOREIGN PATENT DOCUMENTS

| JP | 2007-087255 A | 4/2007 |
| JP | 2009-211160 A | 9/2009 |

OTHER PUBLICATIONS

Evaluation Tools, http://www.lni.wa.gov/Safety/Topics/Ergonomics/ServicesResources/Tools/default.asp printed on Jun. 29, 2012, 1 pg.

Safety and Health Topics | Ergonomics—Additional Information, http://www.osha.gov/SLTC/ergonomics/resources.html printed on Jun. 29, 2012, 3 pgs.

Ergonomics: OSH Answers, http://www.ccohs.ca/oshanswers/ergonomics/ printed on Jun. 29, 2012, 1 pg.

Performing Effective Ergonomic Evaluations—Occupational Health & Safety, http://www.ohsonline.com/Articles/2003/09/Performing-Effective-Ergonomic-Evaluations.aspx?p=1 printed on Jun. 29, 2012, 4 pgs.

Exposure assessment—Wikipedia, the free encyclopedia, http://en.wikipedia.org/w/index.php?title=Exposure_assessment&printable=yes printed on Jun. 29, 2012, 5 pgs.

Occupational safety and health—Wikipedia, the free encyclopedia, http://en.wikipedia.org/w/index.php?title=Occupational_safety_and_health&printable=yes printed on Jun. 29, 2012, 15 pgs.

Risk assessment—Wikipedia, the free encyclopedia, http://en.wikipedia.org/w/index.php?title=Risk_assessment&printable=yes printed on Jun. 29, 2012, 8 pgs.

Basic Information | Risk Assessment Portal | US EPA, http://epa.gov/riskassessment/basicinformation.htm printed on Jun. 29, 2012, 5 pgs.

European Search Report dated Nov. 13, 2013 for European Application No. 13 183 387.3, 7 pages.

Notice of Reasons for Rejection dated Aug. 22, 2017 for Application No. 2013-186123.

Chinese Office Action dated Feb. 19, 2019; Chinese Application No. 2013104082345.

Decision of Rejection dated Jun. 27, 2019; Chinese Patent Application No. 2013104082345.

\* cited by examiner

ERGONOMIC SAFETY EVALUATION WITH LABOR TIME STANDARD

TECHNOLOGICAL FIELD

The present disclosure relates generally to ergonomics risk management and, in particular, to a process to proactively manage ergonomics risks for manufacturing.

BACKGROUND

In general, the majority of the injuries that occur in the manufacturing of large complex systems such as vehicles, aircraft and the like are associated with exposure to ergonomics risk factors. Epidemiologic research shows that prolonged exposures to such risks are causal factors that contribute to the onset of work related musculoskeletal disorders. Mitigation efficacy is particularly confounded by product size, shape, and configuration constraints.

Although industry standards exist to control the exposure to ergonomics risk factors, attempts to apply them by manufacturers have generally proven ineffective. As a direct result, costs of operations are negatively impacted by reduced worker productivity and product quality, and increased incident of injuries. Furthermore, inherent variation in task sequencing and process cycle times make evaluating ergonomics risks complex in larger scale manufacturing processes. Similarly, standardizing safe work practices is difficult to achieve.

Designing large complex systems for ease of assembly and manufacturing ergonomics is difficult when the size and complexity of the system, as well as cost targets, product-performance constraints and the time intervals that exist between new product development initiatives are considered. It is important therefore, to leverage opportunities to reduce the potential for injuries in production operations from exposure to ergonomics risk factors. A typical aircraft includes 100,000 assemblies that have ergonomic impact. Each of these 100,000 assemblies may have a respective work plan that typically includes 30 operations (work instructions), and each operation typically includes 20 activities (work tasks).

Ergonomic risk management during manufacturing typically occurs by an assessor's manual observation to capture the activities, ergonomic stress values and duration, and subsequent tabulation and calculations to develop an overall ergonomic assessment rating. This process is typically done while the assessor actually observes the assembly work tasks, using a paper checklist to record the worker's activities. Observation, recording and subsequent calculations to arrive at the final assessment typically takes one work day (eight working hours) per work plan, but can take even longer. For the typical aircraft with 100,000 work plans in production, this assessment may require upward of 100,000 work days, or 800,000 working hours.

Manually-performed assessments are unique that each assessor will quantify the overall forces and duration of the entire work plan, and with no attempt being made to standardize or quantify the work tasks to arrive at the final assessment. This manual process presents issues in accuracy and repeatability of the assessment in that there is no documented statement of the work tasks involved in the final assessment, and auditing of the final assessment for accuracy requires another fully-involved manual assessment.

Because the work tasks of the work plan are not documented or standardized in the manual ergonomic assessment, any changes in the work tasks or the quantity of work tasks may invalidate the ergonomic assessment and again require another fully-involved manual assessment.

The manual ergonomic assessment process is typically reactive to the release of a work plan. That is, work plans (part assemblies) are typically only assessed after its release when an ergonomic injury has already occurred, been reported, or is suspected of causing injury. This is due to a number of factors including the enormous logistics of complex systems such as aircraft and the volume of workers involved in its manufacture. The process also typically requires an assessor who is trained, skilled and certified in the ergonomic assessment process. The number of qualified assessors is typically limited, and as such, it is typically not feasible to employ enough qualified assessors for the amount of work plans to be reviewed.

Therefore, it may be desirable to have a method and apparatus that takes into account at least some of the issues discussed above, as well as possibly other issues.

BRIEF SUMMARY

Example embodiments of the present disclosure are generally directed to an integrated safety-evaluation with labor-time-standard system, and corresponding method and computer-readable storage medium. Example embodiments may be integrated into plan authoring and engineering design systems to retrieve work-related information, which may be used to automatically calculate and determine the ergonomic risk evaluation and labor time standard values. Example embodiments may be configured to proactively and concurrently provide an ergonomic safety evaluation and labor time standard prior to release to the worker, which may eliminate any potential risk from the work task.

In accordance with example embodiments, activities may be determined from the components (e.g. parts list, text, etc.) that compose the operations (work instructions) of a work plan. This information may be used to define work tasks and quantity or duration of the work tasks to calculate the time standard and ergonomic risk assessment.

Work tasks may be clearly and precisely defined by pre-determined time standards methods for motion and movement, and once defined, these work tasks may be non-changing. Subsequently, an ergonomic risk (by category) may be applied to the defined work tasks, and because the work tasks are non-changing, the ergonomic risk for the work task may also be non-changing. As the work tasks may be determined by the components of the work plan, arbitrary or subjective activities may be left out of the work plan assessment. Example embodiments may better maintain accuracy and consistency of the ergonomic assessment as the work tasks, frequency and duration may be fully documented and controlled through the time standards application process, by discrete quantifiable inputs, without subjective observations.

By using the components of the work plan, example embodiments may at least partially if not fully automate the determination of work tasks in the work instructions, requiring minimal manual inputs or determinations. The effort to determine the time standard and ergonomic assessment may therefore also be at least partially if not fully automated for the work instructions of the work plan. Due to the automation, the throughput for a time standard and ergonomic assessment may be generally in the duration of seconds or minutes (with typical assessments provided in three minutes for an entire work plan). For the typical aircraft with 100,000 work plans in production, the assessment of example embodiments may require 625 work days (100,000 work plans×3 minutes per plan/8 hours/day), or 5,000 working hours. This is in comparison to the 100,000 work days, or 800,000 working hours, which may be required to perform a manual assessment.

The automation may also reduce the need for skilled or trained assessors, as the determination process may be based on objective pre-determined components of the work tasks. This allows manufacturers a two-fold benefit: a) manufacturers can use non-ergonomic skilled workers to perform the assessment process, and b) ergonomic skilled workers can concentrate on rating the work tasks as common components used across the entire production process. Moreover, ergonomic assessments may be applied as the work plan is generated, well before its release to the worker. Any hazardous work plans may therefore be rejected before release, thereby eliminating the exposure of workers to unsafe work plans.

In accordance with example embodiments, creation of the ergonomic safety evaluation and labor time standard may be combined into a single standardized method, which may be based on a normal population and risk exposure thresholds for a daily safe maximum. Example embodiments may use a standardized basis for risk exposure based on incremental exposure durations (e.g., $1/100,000$th of an hour) for any given work element, as can be applied to any individual body part, body parts, or the entire body of the worker. Work instructions may be evaluated against a pre-determined safety threshold for any body part or the entire body of the worker, which may be compensated for a local population of workers as compared to a standard normal population of workers.

According to one aspect of example embodiments, the system includes a work-task manager coupled to an integrated module and ergonomic safety evaluator. The work-task manager may be configured to receive a plurality of work plans each of which includes a plurality of work instructions. For each work instruction, the work-task manager may be configured to determine work elements applicable to the work instruction, with the work elements may have respective associated elemental unit times, elemental risk ratings and frequency values. The integrated module may be configured to receive the elemental unit times, elemental risk ratings and frequency values for the work elements, and calculate a labor time standard and ergonomic safety rating therefrom. And the ergonomic safety evaluator may be configured to receive the labor time standard and ergonomic safety rating and perform an ergonomic safety evaluation therefrom. In this regard, the ergonomic safety evaluator may be configured to perform the ergonomic safety evaluation to determine whether to release or reject the work instruction.

In one example, the ergonomic safety evaluator being configured to perform the ergonomic safety evaluation may include being configured to compare the ergonomic safety rating to a maximum threshold allowance. This maximum threshold allowance may be a numeric value representing a level of risk acceptable to allow release of the work instruction, the maximum threshold allowance being a function of the labor time standard. In a further example, the maximum threshold allowance may be further a function of a risk capacity factor that is a numeric value indicating an ability for an average worker of a local workforce to tolerate ergonomic risk or stress in comparison to an average worker of a global workforce population.

In one example, the integrated module being configured to calculate the labor time standard may include being configured to calculate elemental time standards for the work elements, and sum the elemental time standards to calculate the labor time standard. In another example, the integrated module being configured to calculate the ergonomic safety rating may include being configured to calculate the elemental time standards for the work elements, multiply the elemental risk ratings and respective elemental time standards to produce respective products, and sum the products to calculate the ergonomic safety rating. In these examples, the elemental time standard for each work element may be calculated as a function of the elemental unit time and frequency value for the respective work element.

In one example, the integrated module being configured to calculate the labor time standard may include being configured to calculate a standardized labor time standard from the elemental unit times and frequency values. It may also include the integrated module being configured to calculate a localized labor time standard from the standardized labor time standard, and from one or more local workforce factors. In this example, the ergonomic safety evaluator being configured to receive the labor time standard may include being configured to receive the localized labor time standard.

In a further example, the local workforce factor(s) may include a personal, fatigue and delay factor that is a numeric value applicable to the local workforce when performing activities required to complete tasks involved in the work instruction. In this example, the integrated module being configured to calculate the localized labor time standard may include being configured to adjust the standardized labor time standard according to the personal, fatigue and delay factor.

In other aspects of example embodiments, a method and computer-readable storage medium are provided for an integrated safety evaluation with labor time standard. The features, functions and advantages discussed herein may be achieved independently in various example embodiments or may be combined in yet other example embodiments further details of which may be seen with reference to the following description and drawings.

BRIEF DESCRIPTION OF THE DRAWING(S)

Having thus described example embodiments of the disclosure in general terms, reference will now be made to the accompanying drawings, which are not necessarily drawn to scale, and wherein:

DETAILED DESCRIPTION

Figure 1:
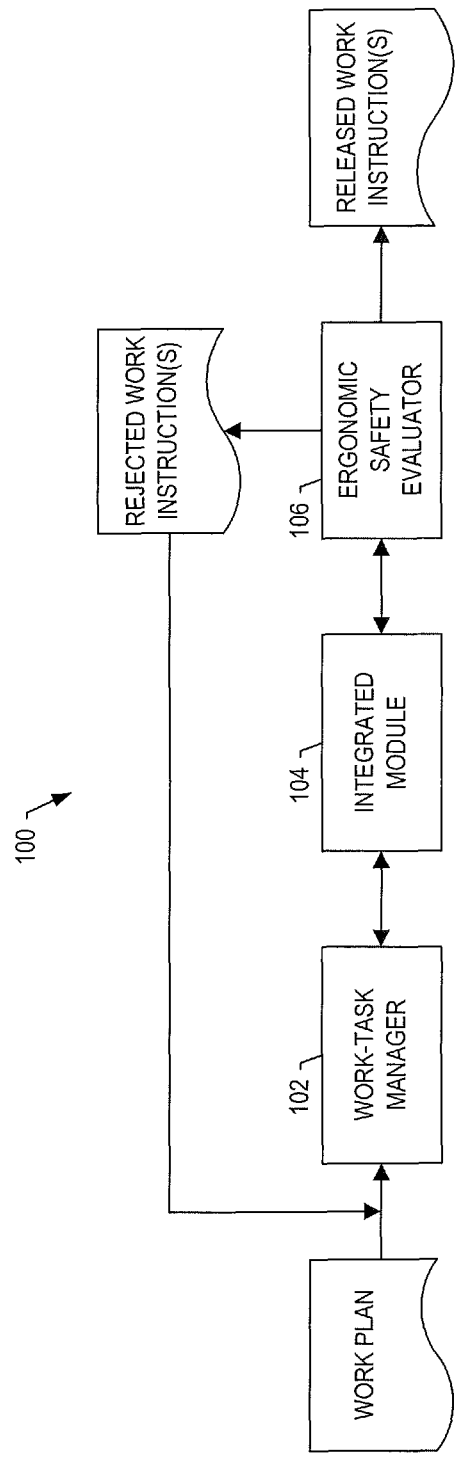
FIG. 1 is an illustration of an integrated safety-evaluation with labor-time-standard system in accordance with an example embodiment.

Some example embodiments of the present disclosure will now be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein; rather, these example embodiments are provided so that this disclosure will be thorough and complete, and will fully convey the scope of the disclosure to those skilled in the art. Like reference numerals refer to like elements throughout.

Example embodiments of the present disclosure relate generally to ergonomics risk management and, in particular, to a process to manage ergonomics risks early in product development. Example embodiments will be primarily described in conjunction with aerospace applications. It should be understood, however, that example embodiments may be utilized in conjunction with a variety of other applications, both in the aerospace industry and outside of the aerospace industry.

Referring now to FIG. 1, an integrated safety-evaluation with labor-time-standard system 100 is illustrated according to example embodiments of the present disclosure. The system may include any of a number of different subsystems (each an individual system) for performing one or more functions or operations with respect to one or more electronic documents. As shown, for example, the system may include a work-task manager 102, integrated module 104 and/or ergonomic safety evaluator 106. Although being shown as part of the integrated safety-evaluation with labor-time-standard system, one or more of the work-task manager, integrated module or ergonomic safety evaluator may instead be separate from but in communication with the integrated safety-evaluation with labor-time-standard system. It should also be understood that one or more of the subsystems may function or operate as a separate system without regard to others of the subsystems. And further, it should be understood that the integrated safety-evaluation with labor-time-standard system may include one or more additional or alternative subsystems than those shown in FIG. 1.

As described herein, manufacturing or production of a tangible or intangible product may include production of an engineering design; and from the engineering design, a work plan may be generated to formalize the instruction necessary to build, create or otherwise complete the requirements or intention of the design. In this regard, an engineering design may include a set of requirements that indicate one or more of the specifications, tolerances, purposes, materials or other aspects of the product. A work plan may include a series of work instructions that together comprise a set of directives to be accomplished by a worker or workers in the effort to construct, build or complete the intended object or purpose of the engineering design. A work instruction, in turn, may include a directive or series of directives for a worker or workers to perform toward building, creating, inspecting or other activities as related to accomplishing the work tasks necessary to build or otherwise complete a portion, percentage or partial outcome of the intended object or purpose of the engineering design. And a work task may refer to an activity or set of activities to be performed by a worker or group of workers which represents specific and repeatable purposes, motions or actions of the worker or workers involved.

As explained in the background section, ergonomic risk management during manufacture of a large complex system such as an aircraft typically occurs by manual observation and calculation using ratings based on repetition and total duration of the entire job to arrive at a risk assessment value, separately and independently from the value obtained for a labor time standard. For typical complex system such as an aircraft, a manual assessment may require upward of 100,000 work days (800,000 working hours), which may require repeating for any change in work tasks or an audit of an existing assessment. This has also typically necessitated reactive assessments by skilled assessors, after historical evidence of high injury areas is apparent. And the assessor's observations are usually made upon workers performing the work to be analyzed, which may expose the workers to risk of injury.

In accordance with example embodiments, work tasks and their quantity or duration may be clearly and precisely defined by pre-determined time standards methods for motion and movement, which may be fully documented and controlled through the time standards application process, by discrete quantifiable inputs, without subjective observations. This may enable the integrated safety-evaluation with labor-time-standard system 100 to calculate the time standard and ergonomic risk assessment significantly faster and with better accuracy and consistency. The same aircraft requiring 100,000 work days under a manual assessment may instead require approximately 625 work days according to example embodiments. This may permit an ergonomic assessment with fewer skilled assessors and before a work plan is released to the worker, which may eliminate the exposure of workers to unsafe work plans.

As explained in greater detail below, then, the work-task manager 102 of the integrated safety-evaluation with labor-time-standard system 100 may be generally configured to receive a plurality of work plans for a complex system, with each work plan including a plurality of work instructions. For each work instruction of each work plan, the work-task manager may be configured to determine applicable work elements, and communicate elemental (unit time and safety rating) and frequency values for the applicable work elements. For each work instruction, then, the integrated module 104 may be generally configured to receive elemental (unit time and safety rating) and frequency values for its work elements, and calculate a standardized labor time standard value and ergonomic safety rating value from the elemental values and frequency values. A labor time standard may be a numeric value representing the total duration of effort required to perform work tasks necessary to accomplish a work instruction, as may have been formulated using a standardized and formalized methodology to accurately estimate the amount of worker effort to accomplish the work tasks. An ergonomic safety rating may be a numeric value representing the potential for ergonomic injury of a work instruction as rated to a standardized normal population of workers.

The integrated module 104 may be further configured to adjust the standardized labor time standard value for a local workforce, thereby producing a localized labor time standard value. The ergonomic safety evaluator 106, then, may be generally configured to receive and evaluate the localized labor time standard value and ergonomic safety value to determine whether to release or reject the work instruction. That is, the ergonomic safety evaluator may be configured to perform an ergonomic safety evaluation, which may provide an overall indication regarding a work instruction as to its potential for ergonomic injury as relates to an ergonomic safety rating adjusted for the local workforce. In one example, the rejected work instruction may be revised mitigate ergonomic risk and resubmitted to the system 100; otherwise, the released work instruction may be provided to the workforce as part of the work plan to carry out a respective engineering design.

Example embodiments may be therefore generally configured to perform and provide an ergonomic risk evaluation and/or a labor time standard as part of an integrated and automated process for a work instruction of a work plan, using a standardized approach to perform concurrent ergonomic risk and labor time standard calculations. The system of example embodiments may perform these calculations based on exposure duration of the labor elements, and may do so using labor elements rated to fractions (e.g., 1/100,000) of an hour. The calculations may be further applied to a working population adjusted to compensate for any deviations in health from a standard normal population. The system may therefore be configured to formulate an ergonomic risk evaluation for any specific part of the human body, combined parts of the human body, or the entire human body as a whole. And the ergonomic risk evaluation may be performed for work instructions to determine their potential impact on the worker before the instructions are released for performance by any worker.

Figure 2:
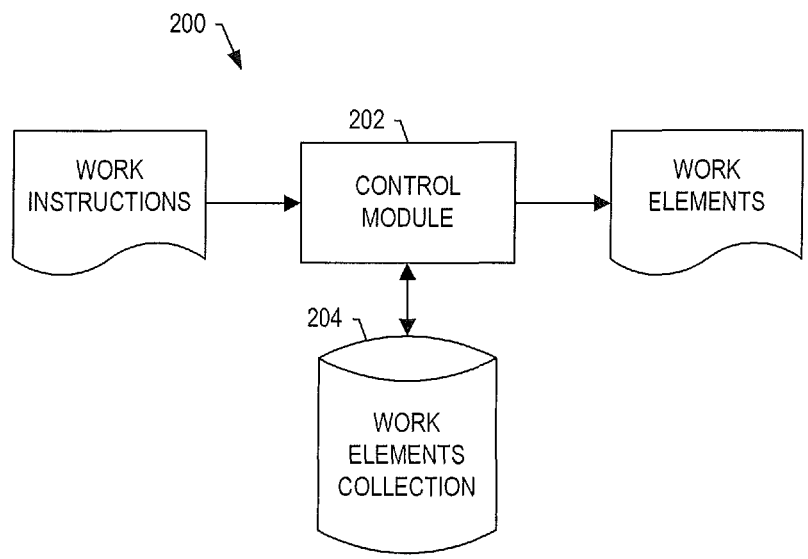
FIG. 2 is an illustration of a work-task manager in accordance with one example embodiment.
Figure 3:
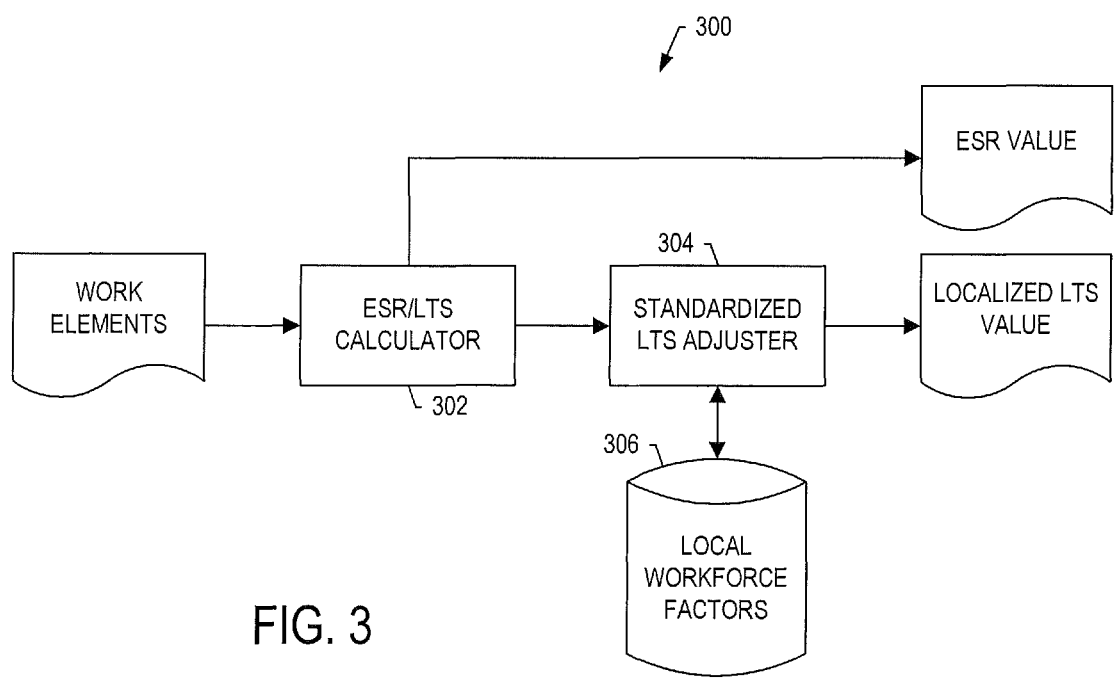
FIG. 3 is an illustration of an integrated module in accordance with one example embodiment.
Figure 4:
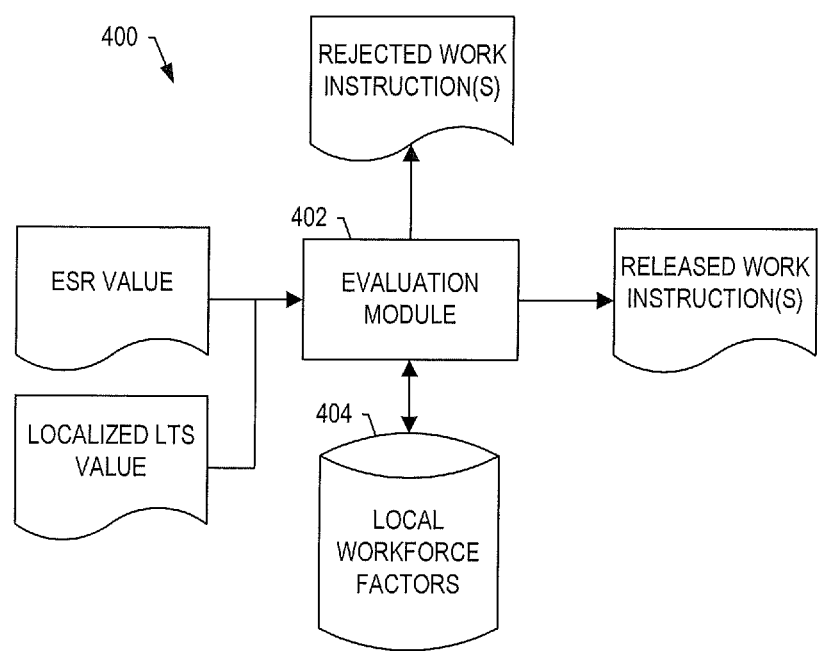
FIG. 4 is an illustration of an ergonomic safety evaluator in accordance with one example embodiment.

Reference will now be made to FIGS. 2, 3 and 4, which illustrate more particular examples of a suitable work-task manager, integrated module and ergonomic safety evaluator, respectively, according to example embodiments of the present disclosure.

FIG. 2 illustrates a work-task manager 200 according to one example embodiment. As shown, for each work instruction of each work plan, the work-task manager may include a control module 202 configured to determine applicable work elements. In this regard, a work instruction may be associated with work tasks, and a work element may be a data element that represents specific attributes related to a respective work task.

The control module 202 may be configured to determine the applicable work elements in any of a number of different manners. In one example, the control module may be configured to determine the applicable work elements based on one or more attributes of the work instruction, which may be input or otherwise received in a number of different manners, such as through pre-determined process knowledge, automated data queries or user input.

In one example, the control module 202 may be configured to retrieve and communicate information related to the work elements applicable to a work instruction, such as from a work elements collection 204. A work element may include a task description, elemental unit time, one or more elemental risk ratings and frequency value. The task description may indicate a specific usage or purpose of the work element, which may be representative or indicative of the work task (or tasks) to be performed. The elemental unit time may be a numeric value representing the duration to perform one repetition of the work task or tasks as indicated in the task description, which may be represented in hours or fractions of an hour (e.g., 1/100,000th of an hour). The elemental risk rating may be a numeric value representing a potential for ergonomic injury to a worker (e.g., normal average worker) when performing one repetition of a respective work task, at a pace indicated by the elemental unit time. In one example, the elemental risk rating may be specified for each body part, group of body parts or the entire body as a whole. And the frequency value may be a numeric value representing the repetition or number of times a work element may be performed or accomplished by a worker or group of workers in the completion of a respective work instruction.

In one example, the elemental risk rating may be standardized to an ergonomic risk maximum threshold over the course of a day (e.g., an eight hour work shift). That is, the elemental risk rating may be a numeric value based on a standardized "safe" repetition limit per day, which in one example may represent the repetition limit that an upper 95th percentile average operator may be exposed to on a daily basis and remain "safe" from potential harm or injury. In one example, the ergonomic risk maximum threshold may be set to 1000 points or risk units per day. The elemental risk rating may also be scaled to the duration of one time measuring unit (TMU), which similar to the elemental unit time may be represented in hours or fractions of an hour (e.g., 1/100,000th of an hour).

In one example, the elemental risk rating may be further attributable to a particular ergonomic category of a plurality of available ergonomic categories. In this regard, each ergonomic category may be defined for a body part, group of body parts, or the entire body as a whole, to be evaluated for potential ergonomic risk or injury as to a worker performing work tasks associated with a work instruction. For example, an ergonomic category may be defined for shoulder abduction, which may relate to motion that moves the upper arm out to the side of the body. In another example, an ergonomic category may be defined for hand-grip force, which may relate to grasping and squeezing an objecting using the hand with full involvement of the fingers and thumb to hold the object against the palm of the hand.

In one example, a work instruction may include n work elements i=1, 2, ... n; and each work element may have a corresponding frequency value FV(i). Each work element may also have an elemental unit time EUT(i), and elemental risk rating $ERR(i_k)$ for an ergonomic category k. The elemental risk rating may be expressed as risk per time unit, such as in accordance with the following:

$$ERR(i_k) = \frac{\text{Risk/Repetition}}{\text{Duration/Repetition}}$$

The risk (Risk/Repetition) attributable to ergonomic category k may be determined by the maximum number of repetitions of a work element that may be performed by a worker in a single day without exposing the worker to immediate or long-term injury. The risk may be rated to the standardized scale based on the ergonomic risk maximum threshold (e.g., 1000 maximum points per day). In one example, the safety may be calculated as follows:

$$\text{Risk/Repetition} = \frac{1000 \text{ Maximum Points/Day}}{\text{Maximum Safe Repetitions/Day}}$$

Duration (Duration/Repetition) may be expressed in time units per repetition (e.g., 1/100,000th of an hour). Duration may be developed in a number of different manners. For example, duration may be developed according to accepted industry methods for predetermined or standardized work measurement practices to represent the duration of time to perform one repetition of the inherent activities of a work element. In one example, the duration for a task may correspond to the elemental unit time for the respective task, EUT(i).

In one example, the elemental risk rating $ERR(i_k)$ for any work element i within an ergonomic category k may be defined by a "risk accumulation rate" (RAR) based on risk points accumulated per duration t. For example, in any given day (e.g., 8 hour day), an operator may receive 1000 points as the maximum safe risk exposure. In this example, it may be possible to calculate a maximum safe RAR for a safe exposure rate at the TMU duration, which may be represented as follows:

$$\text{Maximum Safe } RAR = \frac{1000 \text{ Maximum Points/Day}}{(8 \text{ hours/day}) \times (100,000 \text{ TMU/hour})}$$

$$= 0.00125 \text{ Points}/TMU$$

Using the maximum safe RAR, other activity risk ratings $ERR(i_k)$ may be defined by a standardized "safety factor" value. This may allow the risk of activities to be compared to other activities as all risk ratings are standardized to the theoretical maximum safe risk accumulation rate. In one example, the safety factor for a work element i within an ergonomic category k may be represented as follows:

$$\text{Safety Factor}(i_k) = \frac{ERR(i_k)}{\text{Maximum Safe } RAR}$$

The safety factor may be a unit-less value. A safety factor less than or equal to 1.0 may be considered safe for a global normal population of workers, whereas a safety factor greater than 1.0 may be considered potentially hazardous for a global normal population of workers.

As or after the control module 202 retrieves the elemental (unit time and risk rating) and frequency values, the control module may be configured to communicate the respective values.

Reference is now made to FIG. 3, which illustrates an integrated module 300 according to one example embodiment. As indicated above, the integrated module 300 may be one example of the integrated module 104 of the integrated safety-evaluation with labor-time-standard system 100 of FIG. 1. As shown in FIG. 3, the integrated module 300 may include an ergonomic safety rating with labor time standard (ESR/LTS) calculator 302 that, for each work instruction of a work plan, may be configured to receive elemental (unit time and risk rating) and frequency values for its applicable work elements, and calculate the standardized labor time standard value and ergonomic safety rating value from the elemental values and frequency values. The elemental and frequency values may be, for example, the respective values from the work-task manager 102, or more particularly in one example, the work-task manager 200 of FIG. 2.

The standardized labor time standard value and ergonomic safety rating value may represent ratings applicable to a global population of workers, which may not necessarily correspond to the local workforce population or account for local environmental impacts. The ESR/LTS calculator 302 may be configured to calculate the standardized labor time standard value in any of a number of different manners. For example, the ESR/LTS calculator may be configured to calculate an elemental time standard for each of its work elements, and sum the elemental time standard values to calculate the standardized labor time standard. The elemental time standard for each work element may be calculated as the product of the elemental unit time and frequency value for the work element. In one example, the elemental time standard ETS(i) for each work element i=1, 2, n may be calculated as follows:

$$ETS(i)=EUT(i) \times FV \quad (i)$$

And in a further example, the standardized labor time standard LTS_std may be calculated from the elemental time standards ETS(i) according to the following:

$$\text{LTS\_std} = \sum_{i=1}^{n} ETS(i)$$

Similar to the standardized labor time standard value, the ESR/LTS calculator 302 may be configured to calculate the ergonomic safety rating value in any of a number of different manners. In one example, the ESR/LTS calculator may be configured to multiply the elemental risk rating for the ergonomic category and elemental time standard for each work element, and sum the products to calculate the ergonomic safety rating. In one example, the ergonomic safety rating $ESR_k$ for an ergonomic category k may be calculated according to the following:

$$ESR_k = \sum_{i=1}^{n} [ESR(i_k) \times ETS(i)]$$

In addition to the ESR/LTS calculator 302, the integrated module 300 may include a standardized labor time standard (LTS) adjuster 304, which may be configured to adjust the standardized labor time standard value for a local workforce. This adjustment may be made using one or more factors 306, which may be predetermined and based on demographics, environmental factors and the like. In one example, the LTS adjuster may be configured to adjust the standardized labor time standard according to personal, fatigue and delay (PFD) factor, which may be a numeric value applicable to the local workforce when performing the activities required to complete the tasks involved in the work instruction. In one example, the LTS adjuster 304 may be configured to multiply the standardized labor time standard LTS_std by the PFD factor to produce a localized labor time standard LTS, which may be represented as follows:

LTS=LTS_std×PFD

As or after the LTS adjuster 304 calculates the localized labor time standard value, the LTS adjuster may be configured to communicate the respective value. The ESR/LTS calculator 302 may be configured to communicate the ergonomic safety rating value.

Reference is now made to FIG. 4, which illustrates an ergonomic safety evaluator 400 according to one example embodiment. As indicated above, the ergonomic safety evaluator 400 may be one example of the ergonomic safety evaluator 106 of the integrated safety-evaluation with labor-time-standard system 100 of FIG. 1. As shown in FIG. 4, the ergonomic safety evaluator 300 may include an evaluation module 402 that, for each work instruction of a work plan, may be configured to receive the localized labor time standard value and ergonomic safety rating value, and perform an ergonomic safety evaluation based on the respective values determine whether to release or reject the work instruction. In this regard, the evaluation module may be configured to determine that the work instruction is relatively safe to perform and release it to the workforce; or otherwise, determine that the work instruction is potentially hazardous to perform and reject it from release to the workforce. The localized labor time standard value and ergonomic safety rating value may be, for example, the respective values from the integrated module 104, or more particularly in one example, the integrated module 300 of FIG. 3.

The evaluation module 402 may be configured to perform the ergonomic safety evaluation in any of a number of different manners. In one example, the evaluation may depend on additional local workforce factors 404 related to local workforce performance, risk mitigation and the like. That is, the evaluation may depend on an expected duration of the work tasks, which may in turn be dependent on the localized labor time standard and local workforce performance. Additionally or alternatively, the evaluation may depend on considerations for mitigation of potentially hazardous activities as applicable to the local workforce. These considerations may be reflected by a mitigation allowance, which may be a value (percentage or otherwise) indicating an amount of additional risk that may be acceptable to allow work instruction release for a work instruction above an acceptable safe risk at any expected task duration. In one example, the mitigation allowance (and a related mitigation threshold) may depend on a risk capacity factor, which may be a numeric value (e.g., numeric percentage) indicating the ability for an average worker of a local workforce to tolerate ergonomic risk or stress in comparison to an average worker of a global workforce population rated at 100%.

In one example, the local workforce performance may be reflected by a local workforce performance factor, which in one example may be the numeric inverse of expected or historical productivity of the average worker in the local workforce. The performance factor may be used as a multiplier in determining the expected duration, which may be the amount of time (e.g., in hours) the average worker in the local workforce will require to complete all the tasks (work elements) of a work instruction with any inherent delays or other causes above and beyond the duration determined by the labor time standard. The expected duration t may be represented as follows:

$$t = LTS \times PF$$

For work instructions whose expected duration less than or equal to the duration set for a day (e.g., 8 hours, the expected duration t may be as above. If the expected duration exceeds the duration set for a day, then t may be reduced to the duration of a day, as that duration may be the maximum work period as represented by the standardized work day for an average worker.

The release or rejection of a work instruction may be contingent on the cumulative risk evaluation of its work elements as compared to the labor time standard duration of the work instruction. In one example, this comparison may be accomplished using a mathematical power curve to the inverse of the expected duration based on a predetermined acceptable ratio for the equation of the power curve for an acceptable risk value at 1 hour total duration of a typical work instruction, and may be accomplished after applying a performance factor for an average worker of the local workforce. The mitigation allowance may therefore be a value that indicates the percentage of additional risk that is acceptable to allow work instruction release for a work instruction with an expected duration of 1 hour above the acceptable safe risk determined at 1 hour, and it may be used to determine the mathematical power curve distribution.

In accordance with example embodiments, a mitigation threshold may represent a mathematical linear relationship of expected duration t versus risk exposure potential, from 0 risk points at time t=0 to 1000 points at t=8 hours. The mitigation threshold MT may be expressed as a function of the expected duration and risk capacity factor, such as in accordance with the following:

$$MT(t) = \left( (1000 \text{ Points/Day}) \times (\text{Risk Capacity}) \times \left( \frac{t}{8 \text{ Hours/Day}} \right) \right)$$

The mitigation allowance may represent an additional level of risk above the risk threshold that may be considered acceptable to the local workforce to allow release of a work instruction. The mitigation allowance may therefore be calculated as the product of the mitigation threshold and an allowance factor AF, and may be expressed as follows:

$$MA(t) = \left( (1000 \text{ Points/Day}) \times (\text{Risk Capacity}) \times \left( \frac{t}{8 \text{ Hours/Day}} \right) \right) \times AF(t)$$

The allowance factor AF at time t may represent the percentage of additional risk above the mitigation threshold, and it may be calculated from a power curve distribution. The power curve distribution may be defined by the locally determined mitigation allowance percentage value as to the amount of additional risk (if any) that may be deemed acceptable for a task lasting 1 hour (i.e., AF(1 hour)) that may allow the work instruction to be released to the workforce. The allowance factor at 1 hour (i.e., AF(1 hour) may be a predetermined percentage value for the local workforce, and may be represented as:

$$AF(t) = \left( \frac{AF(1 \text{ Hour})}{7} \right) \times \left( \frac{8}{t} - 1 \right)$$

The mitigation threshold and mitigation allowance may be used to calculate a maximum threshold allowance, which may be a numeric value representing a level of risk acceptable to allow release of the work instruction. The maximum threshold allowance may be a function of the expected duration, and thereby also a function of the localized labor time standard. More particularly, for example, the maximum threshold allowance may represent the combination of the mitigation threshold and the additional mitigation allowance versus the expected duration of the work instruction. The maximum threshold allowance may be represented as a function of the mitigation threshold MT(t) and mitigation allowance MA(t), such as in accordance with the following:

$$MTA(t) = MT(t) + MA(t)$$

$$MTA(t) = \left( (1000 \text{ Points/Day}) \times (\text{Risk Capacity}) \times \left( \frac{t}{8 \text{ Hours/Day}} \right) \right) \times (1 + AF(t))$$

Figure 5:
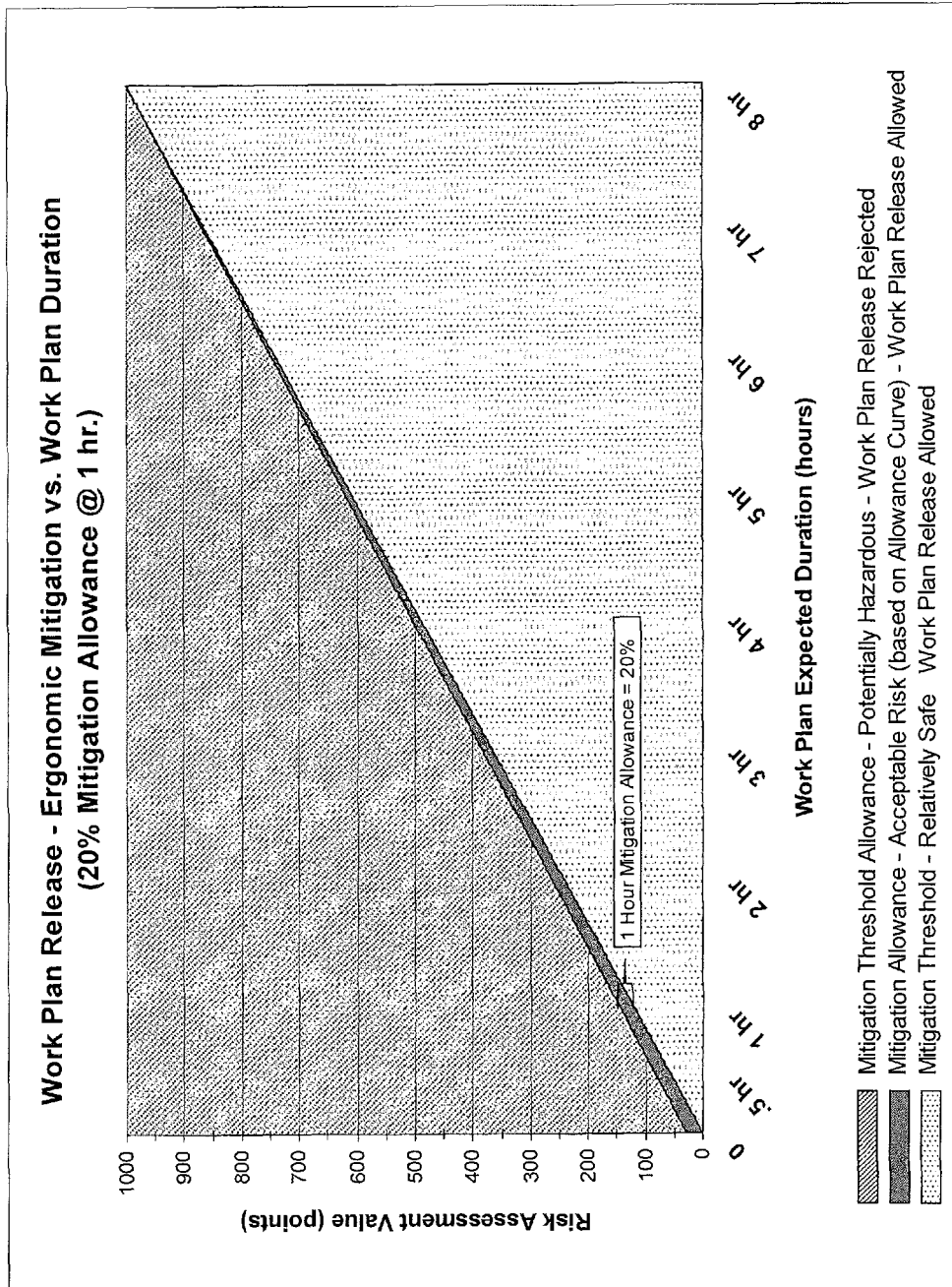
FIG. 5 graphically illustrates a relation between a maximum threshold allowance, mitigation threshold and mitigation allowance according to one example.

FIG. 5 graphically illustrates the aforementioned relation between, MTA(t), MT(t) and MA(t).

In one example, the evaluation module 402 being configured to perform the ergonomic safety evaluation may include the evaluation module being configured to compare the ergonomic safety rating for each ergonomic category with the maximum threshold allowance at the expected duration. In an instance in which all of the ergonomic safety ratings for all of the ergonomic categories are less than or equal to the maximum threshold allowance at the expected duration, the evaluation module may be configured to release the work instruction. Otherwise, in an instance in which any of the ergonomic safety ratings for any of the ergonomic categories is greater than the maximum threshold allowance at the expected duration, the evaluation module may be configured to reject the work instruction. These instances may be represented as follows:

For every ergonomic category k applicable to the work instruction,

If all $ESR_k <= MTA(t)$, then release work instruction; otherwise,

If any $ESR_k > MTA(t)$, then reject work instruction.

According to example embodiments of the present disclosure, the integrated safety-evaluation with labor-time-standard system 100 and its subsystems including the work-task manager 102, integrated module 104 and ergonomic safety evaluator 106 may be implemented by various means. Similarly, the examples of a work-task manager 200, integrated module 300 and ergonomic safety evaluator 400, including each of their respective elements, may be implemented by various means according to example embodiments. Means for implementing the systems, subsystems and their respective elements may include hardware, alone or under direction of one or more computer program code instructions, program instructions or executable computer-readable program code instructions from a computer-readable storage medium.

In one example, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary embodiments of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor (e.g., processor unit) connected to a memory (e.g., storage device).

The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of manufacturing a vehicle, the method comprising:
    producing an engineering design of a vehicle including a plurality of subassemblies;
    generating a plurality of work plans for respective ones of the plurality of subassemblies to formalize instruction to manufacture the plurality of subassemblies according to the engineering design of the vehicle, wherein each work plan of the plurality of work plans includes a plurality of work instructions;
    performing ergonomic safety evaluations of the plurality of work plans by one or more non-ergonomic skilled users using a computer system, including for each work instruction:
        determining a plurality of non-changing tasks using pre-determined components of one of the plurality of work plans without subjective observations;
        determining work elements applicable to the work instruction, the work elements having respective associated elemental unit times, elemental risk ratings and frequency values, each elemental risk rating of a work element representing a potential for ergonomic injury to an average worker of a standard normal population of workers when performing one repetition of the work element at a pace indicated by an elemental unit time of the work element;
        calculating a labor time standard from the elemental unit times and frequency values, and calculate an ergonomic safety rating from the elemental unit times, frequency values and elemental risk ratings, the ergonomic safety rating being a numeric value representing the potential for ergonomic injury to the average worker when performing the work instruction; and
        performing an ergonomic safety evaluation of the work instruction from the labor time standard and ergonomic safety rating, the ergonomic safety evaluation indicating an ergonomic risk of the plurality of non-changing tasks and being performed to determine whether to release or reject the work instruction;
    releasing the plurality of work plans based on the ergonomic safety evaluations; and thereafter,
    manufacturing the plurality of subassemblies according to the plurality of work plans and thereby the engineering design of the vehicle.

2. The method of claim 1, wherein calculating the labor time standard includes:
    calculating elemental time standards for the work elements, the elemental time standard for each work element being calculated as a function of the elemental unit time and frequency value for the respective work element; and
    summing the elemental time standards to calculate the labor time standard.

3. The method of claim 1, wherein calculating the ergonomic safety rating includes:
    calculating elemental time standards for the work elements, the elemental time standard for each work element being calculated as a function of the elemental unit time and frequency value for the respective work element;
    multiplying the elemental risk ratings and respective elemental time standards to produce respective products; and
    summing the products to calculate the ergonomic safety rating.

4. The method of claim 1, wherein calculating the labor time standard includes:
    calculating a standardized labor time standard from the elemental unit times and frequency values; and
    calculating a localized labor time standard from the standardized labor time standard, and from one or more local workforce factors,
    wherein performing the ergonomic safety evaluation includes performing the ergonomic safety evaluation from the localized labor time standard.

5. The method of claim 4, wherein the one or more local workforce factors include a personal, fatigue and delay factor that is a numeric value applicable to the local workforce when performing activities required to complete the plurality of non-changing tasks involved in the work instruction, and
    wherein calculating the localized labor time standard includes adjusting the standardized labor time standard according to the personal, fatigue and delay factor.

6. The method of claim 1, wherein performing the ergonomic safety evaluation includes comparing the ergonomic safety rating to a maximum threshold allowance that is a numeric value representing a level of the ergonomic risk acceptable to allow release of the work instruction, the maximum threshold allowance being a function of the labor time standard.

7. The method of claim 6, wherein the maximum threshold allowance is further a function of a risk capacity factor that is a numeric value indicating an ability for an average worker of a local workforce to tolerate the ergonomic risk or stress in comparison to an average worker of a global workforce population.

8. The method of claim 1, wherein each elemental unit time of a work element represents a duration to perform one repetition of the work element, and each frequency value of a work element represents a number of times the work element is performed or accomplished in completion of the work instruction.

\* \* \* \* \*